US010965955B2

(12) United States Patent
Chen et al.

(10) Patent No.: US 10,965,955 B2
(45) Date of Patent: Mar. 30, 2021

(54) METHOD AND APPARATUS OF MOTION REFINEMENT FOR VIDEO CODING

(71) Applicant: MEDIATEK INC., Hsinchu (TW)

(72) Inventors: Ching-Yeh Chen, Taipei (TW); Tzu-Der Chuang, Zhubei (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/471,689

(22) PCT Filed: Dec. 19, 2017

(86) PCT No.: PCT/CN2017/117152
§ 371 (c)(1),
(2) Date: Jun. 20, 2019

(87) PCT Pub. No.: WO2018/113658
PCT Pub. Date: Jun. 28, 2018

(65) Prior Publication Data
US 2019/0320199 A1      Oct. 17, 2019

Related U.S. Application Data

(60) Provisional application No. 62/439,200, filed on Dec. 27, 2016, provisional application No. 62/437,759, filed on Dec. 22, 2016.

(51) Int. Cl.
*H04N 19/577* (2014.01)
*H04N 19/105* (2014.01)
(Continued)

(52) U.S. Cl.
CPC ......... *H04N 19/577* (2014.11); *H04N 19/105* (2014.11); *H04N 19/117* (2014.11);
(Continued)

(58) Field of Classification Search
CPC ... H04N 19/577; H04N 19/105; H04N 19/523
See application file for complete search history.

(56) References Cited

U.S. PATENT DOCUMENTS

| 2003/0099294 A1* | 5/2003 | Wang | H04N 19/105 |
| | | | 375/240.15 |
| 2010/0226432 A1* | 9/2010 | Wittmann | H04N 19/523 |
| | | | 375/240.12 |

(Continued)

FOREIGN PATENT DOCUMENTS

CN          104604237 A       5/2015

OTHER PUBLICATIONS

A. Alshin, et al ., "AHG6 : On BIO memory bandwidth", JVET D0042: Joint Video Exploration Team ( JVET ) of ITU-T SG 16 WP 3 and ISO / IEC JTC 1 / SC 29 / WG 11 , 4th Meeting : Chengdu, CN , Oct. 15-21, 2016 (Year: 2016).*

(Continued)

*Primary Examiner* — Jamie J Atala
*Assistant Examiner* — Michael Robert Cammarata
(74) *Attorney, Agent, or Firm* — Oblon, McClelland, Maier & Neustadt, L.L.P.

(57) ABSTRACT

Method and apparatus of using Pattern-based MV derivation (PMVD), Bi-directional optical flow (BIO) or Decoder-side MV refinement (DMVR) to refine motion for a bi-direction predicted block are disclosed. According to one method of the present invention, a first and a second motion-compensated reference blocks associated with the current block in a first and a second reference pictures from reference picture list 0 and list 1 are determined respectively. The PMVD process, BIO process or DMVR process is applied to generate motion refinement for the current block using reference data corresponding to the first motion-compensated reference block and the second motion-compensated reference block without other reference data outside the first motion- (Continued)

compensated reference block and the second motion-compensated reference block so as to reduce required system memory bandwidth. Also an adaptive block size method for block-based BIO is disclosed.

9 Claims, 7 Drawing Sheets

(51) Int. Cl.
*H04N 19/117* (2014.01)
*H04N 19/159* (2014.01)
*H04N 19/176* (2014.01)
*H04N 19/513* (2014.01)

(52) U.S. Cl.
CPC ......... *H04N 19/159* (2014.11); *H04N 19/176* (2014.11); *H04N 19/513* (2014.11)

(56) References Cited

U.S. PATENT DOCUMENTS

| | | | |
|---|---|---|---|
| 2013/0107958 A1 | 5/2013 | Shimada et al. | |
| 2014/0003495 A1* | 1/2014 | Chuang | H04N 19/51 375/240.02 |
| 2015/0208089 A1 | 7/2015 | Kim et al. | |
| 2017/0339404 A1* | 11/2017 | Panusopone | H04N 19/105 |
| 2018/0376165 A1* | 12/2018 | Alshin | H04N 19/176 |
| 2019/0110076 A1* | 4/2019 | Lim | G06T 5/006 |
| 2019/0141333 A1* | 5/2019 | Lee | H04N 19/124 |
| 2019/0230350 A1* | 7/2019 | Chen | H04N 19/105 |
| 2020/0053387 A1* | 2/2020 | Lee | H04N 19/139 |

OTHER PUBLICATIONS

A. Alshin, E. Alshina and T. Lee, "Bi-directional optical flow for improving motion compensation," 28th Picture Coding Symposium, Nagoya, 2010, pp. 422-425 (Year: 2010).*

A. Alshin and E. Alshina, "Bi-directional Pptical Flow for Future Video Codec," 2016 Data Compression Conference (DCC), Snowbird, UT, 2016, pp. 83-90. (Year: 2016).*

A. Alshin and E. Alshina, "BIO performance complexity trade-off," 2016 Picture Coding Symposium (PCS), Nuremberg, 2016, pp. 1-4. (Year: 2016).*

International Search Report dated Mar. 15, 2018, issued in application No. PCT/CN2017/117152.

Alexander, A., et. al., "Bi-directional Optical Flow for Future Video Codec;" 2016 Data Compression Comference; Apr. 2016; pp. 83-90.

Young, S.I., et al.; "Optimizing block-coded motion parameters with block-partition graphs;" IEEE; Sep. 2016; pp. 2037-2041.

Alshina, E., et al.; "Bi-directional Optical Flow," Joint Collaborative Team on Video Coding (JCT-VC) of ITU-T SG16 WP3 and ISO/IEC JTC1/SC29/WG11; Oct. 2010; pp. 1-5.

Extended European Search Report dated Apr. 29, 2020 in European Patent Application No. 17883310.9, 12 pages.

Ulrich Benzler, "Block Boundary Mirroring for Motion Interpolation," Joint Video Team (JVT) of ISO/IEC MPEG & ITU-T VCEG (ISO/IEC JTC1/SC29/WG11 and ITU-T SG16 Q.6), Document: JVT-D106, Jul. 2002, XP030005378, pp. 1-6.

Sixin Lin, et al., "TE1: Huawei report on DMVD improvements," Joint Collaborative Team on Video Coding (JCT-VC) of ITU-T SG16 WP3 and ISO/IEC JTC1/SC29/WG11, Document: JCTVC-B037, Jul. 2010, XP030007617, pp. 1-13.

Xu Chen, et al., "Decoder-Side Motion Vector Refinement Based on Bilateral Template Matching," Joint Video Exploration Team (JVET) of ITU-T SG 16 WP 3 and ISO/IEC JTC 1/SC 29/WG 11, Document: JVET-D0029, Oct. 2016, XP030150255, pp. 1-4.

* cited by examiner

METHOD AND APPARATUS OF MOTION REFINEMENT FOR VIDEO CODING

CROSS REFERENCE TO RELATED APPLICATIONS

The present invention claims priority to U.S. Provisional Patent Application, Ser. No. 62/437,759, filed on Dec. 22, 2016 and U.S. Provisional Patent application, Ser. No. 62/439,200, filed on Dec. 27, 2016. The U.S. Provisional Patent Applications are hereby incorporated by reference in their entireties.

FIELD OF THE INVENTION

The present invention relates to motion compensation using Pattern-based MV Derivation (PMVD), Bi-directional Optical flow (BIO) or Decoder-side MV Refinement (DMVR) to refine motion for a bi-direction predicted block. In particular, the present invention relates to bandwidth reduction associated with the PMVD, BIO or DMVR process.

BACKGROUND AND RELATED ART

Bi-Directional Optical Flow (BIO)

Figure 1:
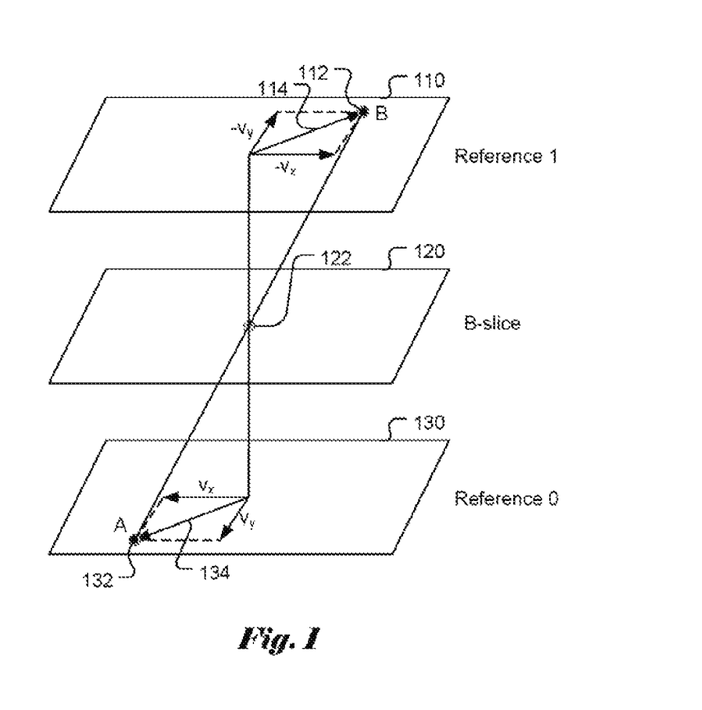
FIG. 1 illustrates an example of Bi-directional Optical Flow (BIO) to derive offset motion vector for motion refinement.

Bi-directional optical flow (BIO) is motion estimation/compensation technique disclosed in JCTVC-C204 (E. Alshina, et al., Bi-directional optical flow, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010, Document: JCTVC-C204) and VCEG-AZO5 (E. Alshina, et al., Known tools performance investigation for next generation video coding, ITU-T SG 16 Question 6, Video Coding Experts Group (VCEG), 52$^{nd}$ Meeting: 19-26 Jun. 2015, Warsaw, Poland, Document: VCEG-AZ05). BIO derived the sample-level motion refinement based on the assumptions of optical flow and steady motion as shown in FIG. 1, where a current pixel 122 in a B-slice (bi-prediction slice) 120 is predicted by one pixel in reference picture 0 and one pixel in reference picture 1. As shown in FIG. 1, the current pixel 122 is predicted by pixel B (112) in reference picture 1 (110) and pixel A (132) in reference picture 0 (130). In FIG. 1, $v_x$ and $v_y$ are pixel displacement vector in the x-direction and y-direction, which are derived using a bi-direction optical flow (BIO) model. It is applied only for truly bi-directional predicted blocks, which is predicted from two reference frames corresponding to the previous frame and the latter frame. In VCEG-AZ05, BIO utilizes a 5×5 window to derive the motion refinement of each sample. Therefore, for an N×N block, the motion compensated results and corresponding gradient information of an (N+4)×(N+4) block are required to derive the sample-based motion refinement for the N×N block. According to VCEG-AZ05, a 6-Tap gradient filter and a 6-Tap interpolation filter are used to generate the gradient information for BIO. Therefore, the computation complexity of BIO is much higher than that of traditional bi-directional prediction. In order to further improve the performance of BIO, the following methods are proposed.

In a conventional bi-prediction in HEVC, the predictor is generated using equation (1), where $P^{(0)}$ and $P^{(1)}$ are the list0 and list1 predictor, respectively.

$$P_{Conventional}[i,j] = (P^{(0)}[i,j] + P^{(1)}[i,j] + 1) >> 1 \qquad (1)$$

In JCTVC-C204 and VECG-AZ05, the BIO predictor is generated using equation (2).

$$P_{OpticalFlow} = (P^{(0)}[i,j] + P^{(1)}[i,j] + v_x[i,j](I_x^{(0)} - I_x^{(1)}[i,j]) + v_y[i,j](I_y^{(0)} - I_y^{(1)}[i,j]) + 1) >> 1 \qquad (2)$$

In equation (2), $I_x^{(0)}$ and $I_x^{(1)}$ represent the x-directional gradient in list0 and list1 predictor, respectively) $I_y^{(0)}$ and $I_y^{(1)}$ represent the y-directional gradient in list0 and list1 predictor, respectively; $v_x$ and $v_y$ represent the offsets in x- and y-direction, respectively. The derivation process of $v_x$ and $v_y$ is shown in the following. First, the cost function is defined as diffCost(x,y) to find the best values $v_x$ and $v_y$. In order to find the best values $v_x$ and $v_y$ to minimize the cost function, diffCost(x,y), one 5×5 window is used. The solutions of $v_x$ and $v_y$ can be represented by using $S_1$, $S_2$, $S_3$, $S_5$, and $S_6$.

$$diffCost(x, y) = \sum_\Omega \left( P^0(x, y) + v_x \frac{\partial P^0(x, y)}{\partial x} + v_y \frac{\partial P^0(x, y)}{\partial y} - \left( P^1(x, y) - v_x \frac{\partial P^1(x, y)}{\partial x} - v_y \frac{\partial P^1(x, y)}{\partial y} \right) \right)^2, \qquad (3)$$

$$= \sum_\Omega (P^0(x, y) - P^1(x, y) + v_x \left( \frac{\partial P^0(x, y)}{\partial x} + \frac{\partial P^1(x, y)}{\partial x} \right) + v_y \left( \frac{\partial P^0(x, y)}{\partial y} + \frac{\partial P^1(x, y)}{\partial y} \right))^2.$$

The minimum cost function min diffCost(x,y), can be derived according to:

$$\frac{\partial diffCost(x, y)}{\partial v_x} = 0, \quad \frac{\partial diffCost(x, y)}{\partial v_y} = 0. \qquad (4)$$

By solving equations (3) and (4), $v_x$ and $v_y$ can be solved according to eqn. (5):

$$v_x = \frac{S_3 S_5 - S_2 S_6}{S_1 S_5 - S_2 S_2}, \quad v_y = \frac{S_1 S_6 - S_3 S_2}{S_1 S_5 - S_2 S_2} \qquad (5)$$

where, $$S_1 = \sum_\Omega \left( \frac{\partial P^0(x, y)}{\partial x} + \frac{\partial P^1(x, y)}{\partial x} \right)^2,$$

$$S_2 = \sum_\Omega \left( \frac{\partial P^0(x, y)}{\partial x} + \frac{\partial P^1(x, y)}{\partial x} \right) \left( \frac{\partial P^0(x, y)}{\partial y} + \frac{\partial P^1(x, y)}{\partial y} \right)$$

$$S_3 = -\sum_\Omega \left( \frac{\partial P^0(x, y)}{\partial x} + \frac{\partial P^1(x, y)}{\partial x} \right)(P^0(x, y) - P^1(x, y)),$$

$$S_5 = \sum_\Omega \left( \frac{\partial P^0(x, y)}{\partial y} + \frac{\partial P^1(x, y)}{\partial y} \right)^2$$

$$S_6 = -\sum_\Omega \left( \frac{\partial P^0(x, y)}{\partial y} + \frac{\partial P^1(x, y)}{\partial y} \right)(P^0(x, y) - P^1(x, y)).$$

In the above equations, $$\frac{\partial P^0(x, y)}{\partial x}$$

corresponds to the x-direction gradient of a pixel at (x,y) in the list 0 picture, $$\frac{\partial P^1(x, y)}{\partial x}$$

corresponds to the x-direction gradient of a pixel at (x,y) in the list 1 picture, $$\frac{\partial P^0(x, y)}{\partial y}$$

corresponds to the y-direction gradient of a pixel at (x,y) in the list 0 picture, and $$\frac{\partial P^1(x, y)}{\partial y}$$

corresponds to the y-direction gradient of a pixel at (x,y) in the list 1 picture.

Figure 2:
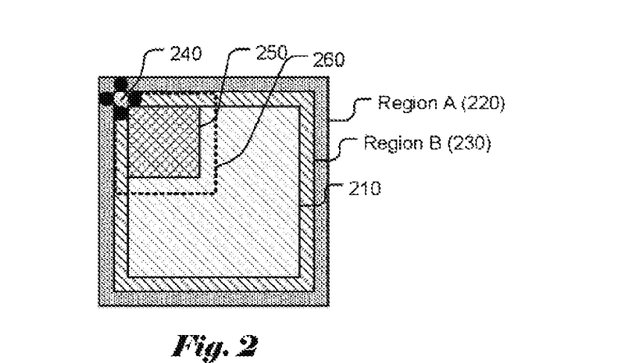
FIG. 2 illustrates the motion-compensated region and its neighbouring pixels required to derive the gradient and displacement related to Bi-directional Optical Flow (BIO).

In VCEG-AZ05, the BIO is implemented on top of HEVC reference software and it is always applied for those blocks that are predicted in true bi-directions. In HEVC, one 8-tap interpolation filter for the luma component and one 4-tap interpolation filter for the chroma component are used to perform fractional motion compensation. Considering one 5×5 window for one to-be-processed pixel in one 8×8 CU in BIO, the required bandwidth in the worst case is increased from (8+7)×(8+7)×2/(8×8)=7.03 to (8+7+4)×(8+7+4)×2/(8×8)=11.28 reference pixels per current pixel. In JVET D0042 (A. Alshin, et al., "AHG6: On BIO memory bandwidth", Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0042), in order to reduce the required bandwidth, the required data including motion compensated pixels and gradients in x and y directions will be set to zeros, if those pixels are outside of current block. As shown in FIG. 2, the centre square is the original MC region (210) for the current block, and BIO process requires the predictors and corresponding gradient in a Region A (220) and Region B (230) to derive the displacement respectively in order to further refine the predictors by using the derived displacement and gradients. In JVET D0042, the data from Region A (220) and Region B (230) will be set to zero in order to save the required bandwidth. Since the gradient is generated from additional 6-tap filters, the gradient and motion compensated pixels can be generated by using the same region as that in the original HEVC. Therefore, by using the method in JVET D0042, there is no additional bandwidth requirement in BIO process.

However, using additional 6-tap filters to generate the gradients in x and y directions are complicated compared to the original motion compensation design. Two additional 6-tap filters will be needed: one is used to generate gradients and the other is used to perform interpolation when the motion vector is fractional. Moreover, block-based process is also proposed to reduce the required computation complexity in VCEG-AZ05. Therefore, a low-complexity BIO is presented in the following. In low-complexity BIO, block-based derivation process is used instead of pixel-based derivation process, where each block is divided into 4×4 blocks (referred as BIO blocks in this disclosure) for block-based BIO process. In the original BIO, a 5×5 window is used to derive motion for each pixel. In the block-based BIO, a 6×6 window is used for each 4×4 block to derive the motion for the block. The calculation of gradients is also simplified by applying a 3-Tap filter with coefficients equal to {−1, 0, 1} on motion compensated pixels according to the low-complexity BIO. In FIG. 2, the smaller block 250 corresponds to a 4×4 block for block-based BIO. The dashed-line block 260 corresponds to the 6×6 window for deriving the motion information associated with the 4×4 block. For each pixel within the window, the predictor and gradient have to be calculated. For the {−1, 0, 1} gradient filter, the gradient in the x-direction and the y-direction for the pixel 240 at the upper left corner of window 260 needs surrounding pixels shown as black dots in FIG. 2. Therefore, the required bandwidth is the same as that in the original BIO, but no additional 6-tap filters are required and computation complexity is reduced by using block-based derivation process. It is desirable to develop methods to reduce the required memory bandwidth and further improve the coding performance of low-complexity BIO.

In a typical video coding system utilizing motion-compensated Inter prediction, motion information is usually transmitted from an encoder sider to a decoder so that the decoder can perform the motion-compensated Inter prediction correctly. In such systems, the motion information will consume some coded bits. In order to improve coding efficiency, a decoder-side motion vector derivation method is disclosed in VCEG-AZ07 (Jianle Chen, et al., Further improvements to HMKTA-1.0, ITU—Telecommunications Standardization Sector, Study Group 16 Question 6, Video Coding Experts Group (VCEG), 52$^{nd}$ Meeting: 19-26 Jun. 2015, Warsaw, Poland). According to VCEG-AZ07, the decoder-side motion vector derivation method uses two Frame Rate Up-Conversion (FRUC) Modes. One of the FRUC modes is referred as bilateral matching for B-slice and the other of the FRUC modes is referred as template matching for P-slice or B-slice.

Pattern-Based MV Derivation (PMVD)

Figure 3:
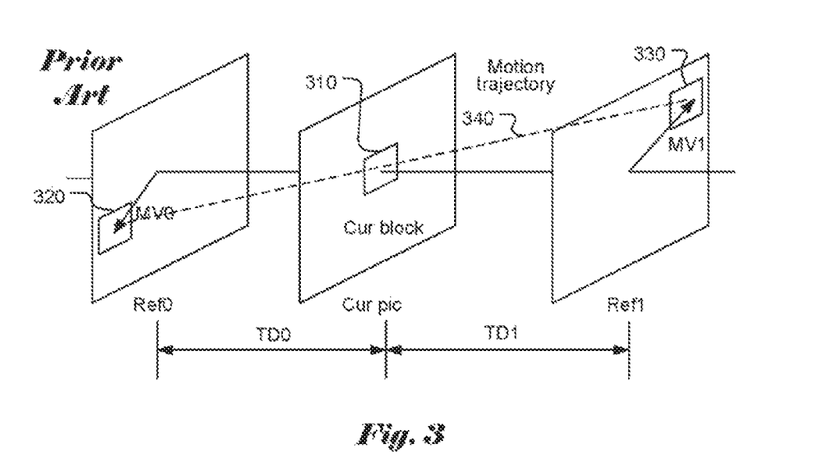
FIG. 3 illustrates an example of motion compensation using the bilateral matching technique, where a current block is predicted by two reference blocks along the motion trajectory.

FIG. 3 illustrates an example of FRUC bilateral matching mode, where the motion information for a current block 310 is derived based on two reference pictures. The motion information of the current block is derived by finding the best match between two blocks (320 and 330) along the motion trajectory 340 of the current block 310 in two different reference pictures (i.e., Ref0 and Ref1). Under the assumption of continuous motion trajectory, the motion vectors MV0 associated with Ref0 and MV1 associated with Ref1 pointing to the two reference blocks 320 and 330 shall be proportional to the temporal distances, i.e., TD0 and TD1, between the current picture (i.e., Cur pic) and the two reference pictures Ref0 and Ref1.

Figure 4:
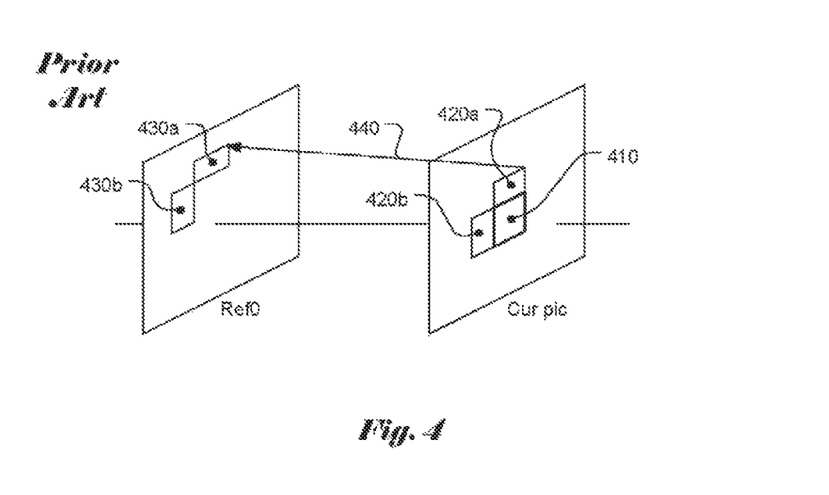
FIG. 4 illustrates an example of motion compensation using the template matching technique, where the template of the current block is matched with the reference template in a reference picture.

FIG. 4 illustrates an example of FRUC template matching mode. The neighbouring areas (420a and 420b) of the current block 410 in a current picture (i.e., Cur pic) are used as a template to match with a corresponding template (430a and 430b) in a reference picture (i.e., Ref0 in FIG. 4). The best match between template 420a/420b and template 430a/

430b will determine a decoder derived motion vector 440. While Ref0 is shown in FIG. 4, Ref1 can also be used as a reference picture.

According to VCEG-AZ07, a FRUC_mrg_flag is signaled when the merge_flag or skip_flag is true. If the FRUC_mrg_flag is 1, then FRUC_merge_mode is signaled to indicate whether the bilateral matching merge mode or template matching merge mode is selected. If the FRUC_mrg_flag is 0, it implies that regular merge mode is used and a merge index is signalled in this case. In video coding, in order to improve coding efficiency, the motion vector for a block may be predicted using motion vector prediction (MVP), where a candidate list is generated. A merge candidate list may be used for coding a block in a merge mode. When the merge mode is used to code a block, the motion information (e.g. motion vector) of the block can be represented by one of the candidates MV in the merge MV list. Therefore, instead of transmitting the motion information of the block directly, a merge index is transmitted to a decoder side. The decoder maintains a same merge list and uses the merge index to retrieve the merge candidate as signalled by the merge index. Typically, the merge candidate list consists of a small number of candidates and transmitting the merge index is much more efficient than transmitting the motion information. When a block is coded in a merge mode, the motion information is "merged" with that of a neighbouring block by signalling a merge index instead of explicitly transmitted. However, the prediction residuals are still transmitted. In the case that the prediction residuals are zero or very small, the prediction residuals are "skipped" (i.e., the skip mode) and the block is coded by the skip mode with a merge index to identify the merge MV in the merge list.

While the term FRUC refers to motion vector derivation for Frame Rate Up-Conversion, the underlying techniques are intended for a decoder to derive one or more merge MV candidates without the need for explicitly transmitting motion information. Accordingly, the FRUC is also called decoder derived motion information in this disclosure. Since the template matching method is a pattern-based MV derivation technique, the template matching method of the FRUC is also referred as Pattern-based MV Derivation (PMVD) in this disclosure.

Figure 5A:
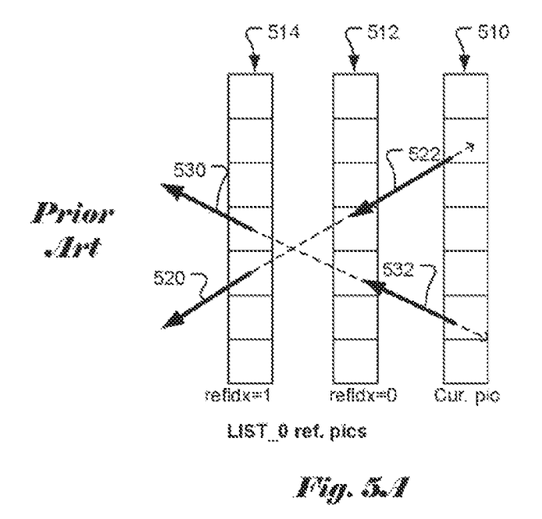
FIG. 5A illustrates an example of temporal motion vector prediction (MVP) derivation process for LIST_0 reference pictures.
Figure 5B:
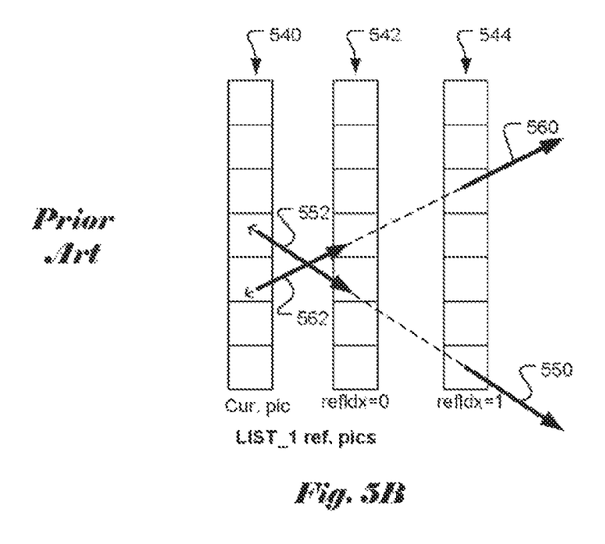
FIG. 5B illustrates an example of temporal motion vector prediction (MVP) derivation process for LIST_1 reference pictures.

In the decoder side MV derivation method, a new temporal MVP called temporal derived MVP is derived by scanning all MVs in all reference pictures. To derive the LIST_0 temporal derived MVP, for each LIST_0 MV in the LIST_0 reference pictures, the MV is scaled to point to the current picture. The 4×4 block that pointed by this scaled MV in current picture is the target current block. The MV is further scaled to point to the reference picture that refIdx is equal 0 in LIST_0 for the target current block. The further scaled MV is stored in the LIST_0 MV field for the target current block. FIG. 5A and FIG. 5B illustrate examples for deriving the temporal derived MVPs for LIST_0 and LIST_1 respectively. In FIG. 5A and FIG. 5B, each small square block corresponds to a 4×4 block. The temporal derived MVPs process scans all the MVs in all 4×4 blocks in all reference pictures to generate the temporal derived LIST_0 and LIST_1 MVPs of current picture. For example, in FIG. 5A, blocks 510, blocks 512 and blocks 514 correspond to 4×4 blocks of the current picture (Cur. pic), LIST_0 reference picture with index equal to 0 (i.e., refidx=0) and LIST_0 reference picture with index equal to 1 (i.e., refidx=1) respectively. Motion vectors 520 and 530 for two blocks in LIST_0 reference picture with index equal to 1 are known. Then, temporal derived MVP 522 and 532 can be derived by scaling motion vectors 520 and 530 respectively. The scaled MVP is then assigned it to a corresponding block. Similarly, in FIG. 5B, blocks 540, blocks 542 and blocks 544 correspond to 4×4 blocks of the current picture (Cur. pic), LIST_1 reference picture with index equal to 0 (i.e., refidx=0) and LIST_1 reference picture with index equal to 1 (i.e., refidx=1) respectively. Motion vectors 550 and 560 for two blocks in LIST_1 reference picture with index equal to 1 are known. Then, temporal derived MVP 552 and 562 can be derived by scaling motion vectors 550 and 560 respectively.

For the bilateral matching merge mode and template matching merge mode, two-stage matching is applied. The first stage is PU-level matching, and the second stage is the sub-PU-level matching. In the PU-level matching, multiple initial MVs in LIST_0 and LIST_1 are selected respectively. These MVs includes the MVs from merge candidates (i.e., the conventional merge candidates such as these specified in the HEVC standard) and MVs from temporal derived MVPs. Two different staring MV sets are generated for two lists. For each MV in one list, a MV pair is generated by composing of this MV and the mirrored MV that is derived by scaling the MV to the other list. For each MV pair, two reference blocks are compensated by using this MV pair. The sum of absolutely differences (SAD) of these two blocks is calculated. The MV pair with the smallest SAD is selected as the best MV pair.

After a best MV is derived for a PU, the diamond search is performed to refine the MV pair. The refinement precision is ⅛-pel. The refinement search range is restricted within ±1 pixel. The final MV pair is the PU-level derived MV pair. The diamond search is a fast block matching motion estimation algorithm that is well known in the field of video coding. Therefore, the details of diamond search algorithm are not repeated here.

For the second-stage sub-PU-level searching, the current PU is divided into sub-PUs. The depth (e.g. 3) of sub-PU is signalled in sequence parameter set (SPS). Minimum sub-PU size is 4×4 block. For each sub-PU, multiple starting MVs in LIST_0 and LIST_1 are selected, which include the MV of PU-level derived MV, zero MV, HEVC collocated TMVP of current sub-PU and bottom-right block, temporal derived MVP of current sub-PU, and MVs of left and above PU/sub-PU. By using the similar mechanism as the PU-level searching, the best MV pair for the sub-PU is determined. The diamond search is performed to refine the MV pair. The motion compensation for this sub-PU is performed to generate the predictor for this sub-PU.

For the template matching merge mode, the reconstructed pixels of above 4 rows and left 4 columns are used to form a template. The template matching is performed to find the best matched template with its corresponding MV. Two-stage matching is also applied for template matching. In the PU-level matching, multiple starting MVs in LIST_0 and LIST_1 are selected respectively. These MVs include the MVs from merge candidates (i.e., the conventional merge candidates such as these specified in the HEVC standard) and MVs from temporal derived MVPs. Two different staring MV sets are generated for two lists. For each MV in one list, the SAD cost of the template with the MV is calculated. The MV with the smallest cost is the best MV. The diamond search is then performed to refine the MV. The refinement precision is ⅛-pel. The refinement search range is restricted within ±1 pixel. The final MV is the PU-level derived MV. The MVs in LIST_0 and LIST_1 are generated independently.

For the second-stage sub-PU-level searching, the current PU is divided into sub-PUs. The depth (e.g. 3) of sub-PU is signalled in SPS. Minimum sub-PU size is 4×4 block. For each sub-PU at left or top PU boundaries, multiple starting MVs in LIST_0 and LIST_1 are selected, which include the MV of PU-level derived MV, zero MV, HEVC collocated TMVP of current sub-PU and bottom-right block, temporal derived MVP of current sub-PU, and MVs of left and above PU/sub-PU. By using the similar mechanism as the PU-level searching, the best MV pair for the sub-PU is determined. The diamond search is performed to refine the MV pair. The motion compensation for this sub-PU is performed to generate the predictor for this sub-PU. For the PUs that are not at left or top PU boundaries, the second-stage sub-PU-level searching is not applied, and the corresponding MVs are set equal to the MVs in the first stage.

In this decoder MV derivation method, the template matching is also used to generate a MVP for Inter mode coding. When a reference picture is selected, the template matching is performed to find a best template on the selected reference picture. Its corresponding MV is the derived MVP. This MVP is inserted into the first position in AMVP. AMVP represents advanced MV prediction, where a current MV is coded predictively using a candidate list. The MV difference between the current MV and a selected MV candidate in the candidate list is coded.

Decoder-Side MV Refinement (DMVR)

Figure 6:
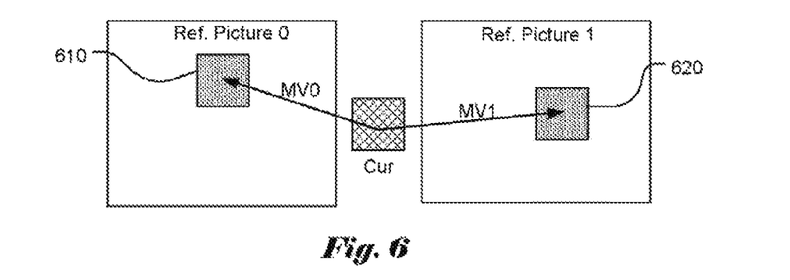
FIG. 6 illustrates an example of Decoder-Side Motion Vector Refinement (DMVR), where a template is generated first by using the bi-prediction from the reference blocks of MV0 and MV1.
Figure 7:
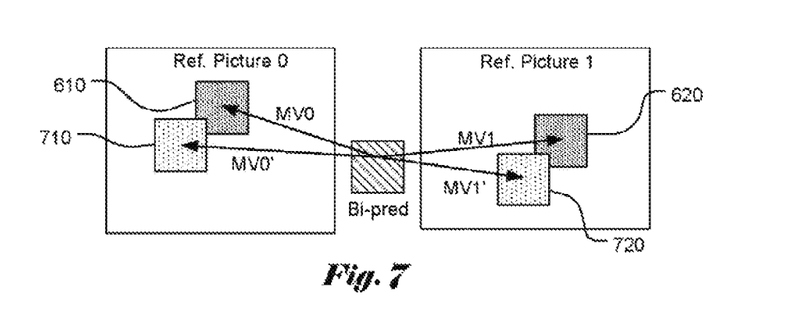
FIG. 7 illustrates an example of Decoder-Side Motion Vector Refinement (DMVR) by using the template generated in FIG. 6 as a new current block and performing the motion estimation to find a better matching block in Ref. Picture 0 and Ref. Picture 1 respectively.

In JVET-D0029 (Xu Chen, et al., "Decoder-Side Motion Vector Refinement Based on Bilateral Template Matching", Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0029), Decoder-Side Motion Vector Refinement (DMVR) based on bilateral template matching is disclosed. A template is generated by using the bi-prediction from the reference blocks (610 and 620) of MV0 and MV1, as shown in FIG. 6. Using the template as a new current block and perform the motion estimation to find a better matching block (710 and 720 respectively) in Ref Picture 0 and Ref. Picture 1, respectively, as shown in FIG. 7. The refined MVs are the MV0' and MV1'. Then the refined MVs (MV0' and MV1') are used to generate a final bi-predicted prediction block for the current block.

Figure 8:
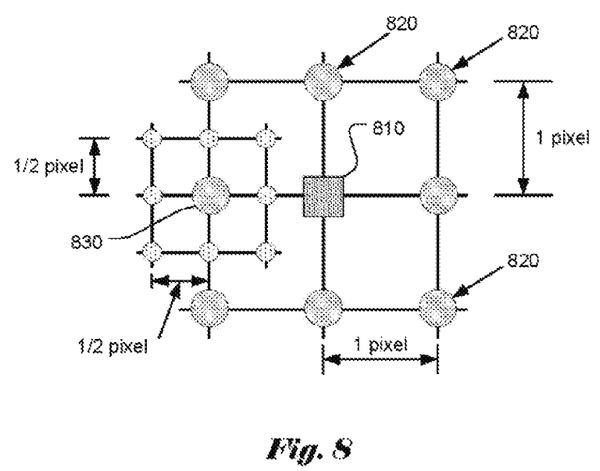
FIG. 8 illustrates an example of two-stage search to refine the MVs of the current block for Decoder-Side Motion Vector Refinement (DMVR).

In DMVR, it uses two-stage search to refine the MVs of the current block. As shown in FIG. 8, for a current block, the cost of current MV candidate (at a current pixel location indicated by a square symbol 810) is first evaluated. In the first stage search, the integer-pixel search is performed around the current pixel location. Eight candidates (indicated by the eight large circles 820 in FIG. 8) are evaluated. The horizontal distance, vertical distance or both between two adjacent circles or between the square symbol and the adjacent circle is one pixel. The best candidate with the lowest cost is selected as the best MV candidate (e.g. candidate at location indicated by circle 830) in the first stage. In the second stage, a half-pixel square search is performed around the best MV candidate in the first stage, as shown as eight small circles in FIG. 8. The best MV candidate with the lowest cost is selected the final MV for the final motion compensation.

It is also desirable to reduce the bandwidth requirement for the system utilizing PMVD or DMVR.

BRIEF SUMMARY OF THE INVENTION

Method and apparatus of using Pattern-based MV derivation (PMVD), Bi-directional optical flow (BIO) or Decoder-side MV refinement (DMVR) to refine motion for a bi-direction predicted block are disclosed. According to one method of the present invention, a first motion-compensated reference block associated with the current block in a first reference picture from reference picture list 0 is determined, where the first motion-compensated reference block includes additional surrounding first pixels around a corresponding block of the current block in the first reference picture for performing interpolation filter required for any fractional motion vector of the current block. Also, a second motion-compensated reference block associated with the current block in a second reference picture from reference picture list 1 is determined, where the second motion-compensated reference block includes additional surrounding second pixels around the corresponding block of the current block in the second reference picture for performing interpolation filter required for any fractional motion vector of the current block. The PMVD process, BIO process or DMVR process is applied to generate motion refinement for the current block using reference data corresponding to the first motion-compensated reference block and the second motion-compensated reference block without other reference data outside the first motion-compensated reference block and the second motion-compensated reference block so as to reduce required system memory bandwidth. The current block is encoded or decoded based on motion-compensated prediction according to the motion refinement.

For BIO, the BIO process may comprise calculating first gradients for first pixels in the first motion-compensated reference block and second gradients for second pixels in the second motion-compensated reference block, deriving displacement in x-direction and y-direction using the first gradients and the second gradients, and generating the motion refinement based on the displacement in the x-direction and the y-direction. Furthermore, calculating the first gradients and the second gradients may use a 3-tap filter corresponding to $\{-1, 0, 1\}$ for non-boundary pixels of the first motion-compensated reference block and the second motion-compensated reference block; and the calculating the first gradients and the second gradients may use a 2-tap filter corresponding to $\{-1, 1\}$ for boundary pixels of the first motion-compensated reference block and the second motion-compensated reference block so as to avoid a need for reference data from outside the first motion-compensated reference block and the second motion-compensated reference block; and wherein the boundary pixels are in one-pixel boundaries of the first motion-compensated reference block or the second motion-compensated reference block.

In one embodiment, the PMVD process, the BIO process or the DMVR process to generate motion refinement for the current block is skipped for boundary pixels of the current block if the PMVD process, the BIO process or the DMVR process for the boundary pixels of the current block requires any reference data outside the first motion-compensated reference block and the second motion-compensated reference block. In another embodiment, if the PMVD process, the BIO process or the DMVR process for the current block requires one or more motion-compensated reference pixels outside the first motion-compensated reference block and the second motion-compensated reference block, the motion-compensated reference pixels can be generated by padding.

A non-transitory computer readable medium storing program instructions causing a processing circuit of an apparatus to perform the above video coding method is also disclosed.

Another method and apparatus of video coding using block-based Bi-directional optical flow (BIO) to refine motion for a bi-direction predicted block are disclosed.

According to this method, the current block is divided into one or more BIO blocks based on one or a combination of video resolution of the video sequence, characteristics related to the current block and size of the current block. For example, if contents of the current block are smoother, the current block can be divided into a smaller number of BIO blocks. In another example, if the current block includes more complicated texture or a more complicated motion region, the current block is divided into a larger number of BIO blocks. In yet another example, the current block corresponds to a coding unit (CU) and the current block is divided into one or more BIO blocks according to the size of the current block. In yet another example, if the current block uses sub-block motion partition, the current block is divided into a larger number of BIO blocks. In yet another example, if a variance value of the first motion-compensated reference block associated with the current block or a variance value of the second motion-compensated reference block associated with the current block is large, the current block is divided into a larger number of BIO blocks. In yet another example, if one or more strong edges in the first motion-compensated reference block associated with the current block or in the second motion-compensated reference block associated with the current block is large, the current block is divided into a larger number of BIO blocks. Thea total number of BIO blocks for the current block is either determined implicitly or signalled explicitly in a bitstream at a sequence level, picture level, slice level, CTU (coding tree unit) level, or CU (coding unit) level.

A non-transitory computer readable medium storing program instructions causing a processing circuit of an apparatus to perform the above video coding method by dividing the current block into one or more BIO blocks based on video resolution of the video sequence, characteristics related to the current block or size of the current block is also disclosed.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned previously, various motion refinement techniques such as Pattern-based MV derivation (PMVD), Bi-directional Optical Flow (BIO) or Decoder-Side Motion Vector Refinement (DMVR) require accessing additional reference data, which causes increased system bandwidth. In the present invention, techniques to reduce the system bandwidth associated with PMVD, BIO and DMVR are disclosed.

Method 1. BIO Bandwidth Reduction

In low-complexity BIO, Region A (220) and Region B (230) as shown in FIG. 1 are used to calculate the gradients, and these gradients are used to derive the displacement and refine the final predictor. In order to further reduce the bandwidth, proposed method according to the present invention does not use the data from Region A (220) and Region B (230). In order to compensate the unavailability of Region B (230) reference data, the gradient calculation for pixels at CU boundary is also changed accordingly. In one embodiment, when the 3-tap filter $\{-1, 0, 1\}$ is used for gradient calculation, one 2-Tap filter with filter coefficients equal to $\{-1, 1\}$ to generate gradients for those pixels at CU boundaries. In other words, for a boundary pixel, the $\{-1, 1\}$ filter is operated on a current pixel at the boundary of the current motion compensated block and a neighbouring pixel within the block. Compared to the 3-tap filter $\{-1, 0, 1\}$, the additional pixel outside the current motion-compensated block that would be required is not needed now. Since the gradient calculation is different, some normalization may be required based on filter tap distance. For example, the gradient calculated by using 3-tap filter, $\{-1, 0, 1\}$ corresponds to the change of pixel values within pixel distance equal to two, and the gradient calculated by using 2-tap filter, $\{-1, 1\}$ corresponds to the change of pixel values within pixel distance equal to one. Therefore, the gradient calculated by using 2-tap filter, $\{-1, 1\}$ should be multiplied by 2 to become the change of pixel values within pixel distance equal to two. In another embodiment, the BIO refinement process for the pixels at CU boundaries is skipped. In another embodiment, a padding method is used to generate pixel values in Region A (220) or Region B (230) instead of performing motion compensation. For example, extending a boundary pixel directly without mirroring can be used to generate all pixels in Region A (220) or Region B (230). Alternatively padding with mirroring can be used to generate all pixels in Region A (220) or Region B (230). After apply padding techniques, BIO process can be applied without other changes.

Method 2. Block Size in BIO Process

In low-complexity BIO, block-based derivation process is used instead of pixel-based derivation process, which can reduce the computation complexity significantly. However, using one pre-defined BIO block size cannot achieve the best coding gain for videos in different resolutions or with different video contents. According to one method of the present invention, the BIO block size is adaptive and can be dependent on video resolution and/or the characteristics of video contents. For example, for smooth regions, the block size should be larger so as to include more textures for deriving an accurate displacement. On the other hand, for complicated texture or motion regions, the block size should be smaller so as to be adapted to the localization. Therefore, in one embodiment, the block size is dependent on video resolution. In another embodiment, the block size is dependent on the CU size. When the CU size is small, then the block size should be small. In another embodiment, the block size is dependent on the usage of sub-block motion partition. If the current CU is coded by using sub-block motion partition, then a smaller block size is used in BIO. In another embodiment, the block size may be dependent on the motion compensated pixels. For example, if the variance of motion compensated pixels is large or there are some strong edges in motion-compensated (MC) regions, then a smaller block size will be used for BIO. The above methods can be combined to implicitly decide the block size for the BIO process. Alternatively, the selected block size for the BIO process can be explicitly signalled in the bitstream at sequence level, picture level, slice level, CTU (coding tree unit) level, or CU (coding unit) level.

Reduced System Bandwidth for PMVD and DMVR

Figure 9:
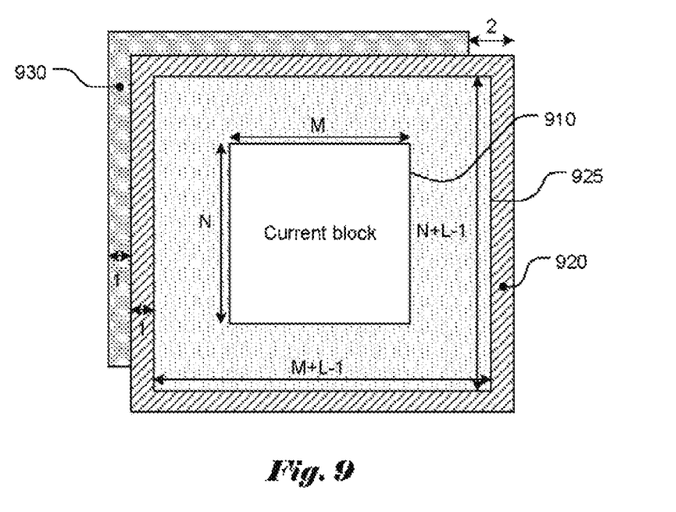
FIG. 9 illustrates an example required reference data by Decoder-Side Motion Vector Refinement (DMVR) for an M×N block with fractional MVs, where a (M+L−1)*(N+L−1) reference block is required for motion compensation.

In the decoder-side predictor refinement tools, such as PMVD, BIO, and DMVR, the process to refine the predictors often requires additional reference samples outside the reference block. For example, for an M×N block 910 with fractional MVs, an (M+L−1)*(N+L−1) reference block 925 is required for motion compensation as shown in FIG. 9, where the L is the interpolation filter tap length. In HEVC, L is equal to 8. For DMVR search, ring area 920 with one-pixel width outside the reference block 925 is required for the first stage search within the (M+L−1)*(N+L−1) reference block 925 plus the ring area 920. If the best candidate is located at upper left side instead of the centre candidate, additional data outside the ring area 920 may be needed. For example, an additional L shape area 930 (i.e. an additional one (M+L−1) pixel row and (N+L−1) pixel column) are required. Therefore, to support the decoder-side predictor refinement tools, the additional bandwidth is required.

In order to reduce the memory bandwidth requirement, a filter coefficient padding method is proposed. First, a valid reference block is defined. The valid reference block can be the same as the original reference block (e.g. a (M+L−1)*(N+L−1) block 925) or a predefined block that contains the original reference block (e.g. the original reference block 925 plus one-pixel ring area 920). Then, when doing the decoder-side MV refinement and/or the final motion compensation, any reference pixels outside the valid reference block will not be used. If an interpolation filter needs the pixels outside the valid reference block, the filter coefficients will be shifted to the boundary coefficient. For example, if an 8-tap filter coefficient set is 1-1, 4, −11, 40, 40, −11, 4, −11 and the left two samples are not in the valid reference block, the filter coefficient set will be changed to {0, 0, −8, 40, 40, −11, 4, −1}. The coefficients of left two samples are rolled into the third sample (i.e., the boundary sample). In this example, the coefficients for the left two samples are {−1, 4} and the coefficient for the boundary pixel is {−11}. The modified coefficient for the boundary pixel becomes {−1}+{4}+{−11}={−8}. If all the samples in the filter process are in the valid reference block, the filter coefficient set is not changed. In another embodiment, if an interpolation filter needs the pixels outside the valid reference block, the filter coefficients corresponding to the outside pixels will be rolled into the coefficient corresponding to the first valid pixel. For example, the coefficients of left two samples are added on top of the centre coefficient, then the centre coefficient becomes {−1}+{4}+{40}={43}. So the filter coefficient set will be changed to {0, 0, −11, 43, 40, −11, 4, −1}.

To illustrate an example of this method based on the DMVR, the valid reference block in FIG. 9 can be the same block of the original reference block (the (M+L−1)*(N+L−1) block 925). All the pixels outside the one-pixel ring area 920 are considered as invalid reference samples. When performing the filtering process in search stage or the final motion compensation, the filter coefficients for the invalid samples will be rolled into the closest valid sample. In one embodiment, the coefficient shifting is only applied on the search stage, not the final motion compensation.

Different coding tool can have different valid reference block setting. For example, for DMVR, the valid block can be the (M+L−1)*(N+L−1) block. For PMVD, the valid block can be the (M+L−1+0)*(N+L−1+P) block where the O and P can be 4.

In PMVD, a two-stage search is performed. The first stage is the PU-level search. The second stage is the sub-PU-level search. In the proposed method, the valid reference block constraint is applied for both the first stage search and the second stage search. The valid reference block of these two stages can be the same.

In another implementation method, the required pixels outside the valid reference block can be generated by using some pixels in the valid reference blocks. For example, all the pixels outside the valid reference block are filled by the closest pixels within the valid reference block. Then, when doing the decoder-side MV refinement and/or the final motion compensation, the padded pixels are used instead of the original pixels if the target pixels are outside the valid reference block.

The proposed filter coefficient shifting or reference pixel generation can be limited to be applied for the certain CUs or PUs. For example, the proposed method can be applied for the CU with the CU area larger than 64 or 256, or can be applied for the bi-prediction blocks.

Figure 10:
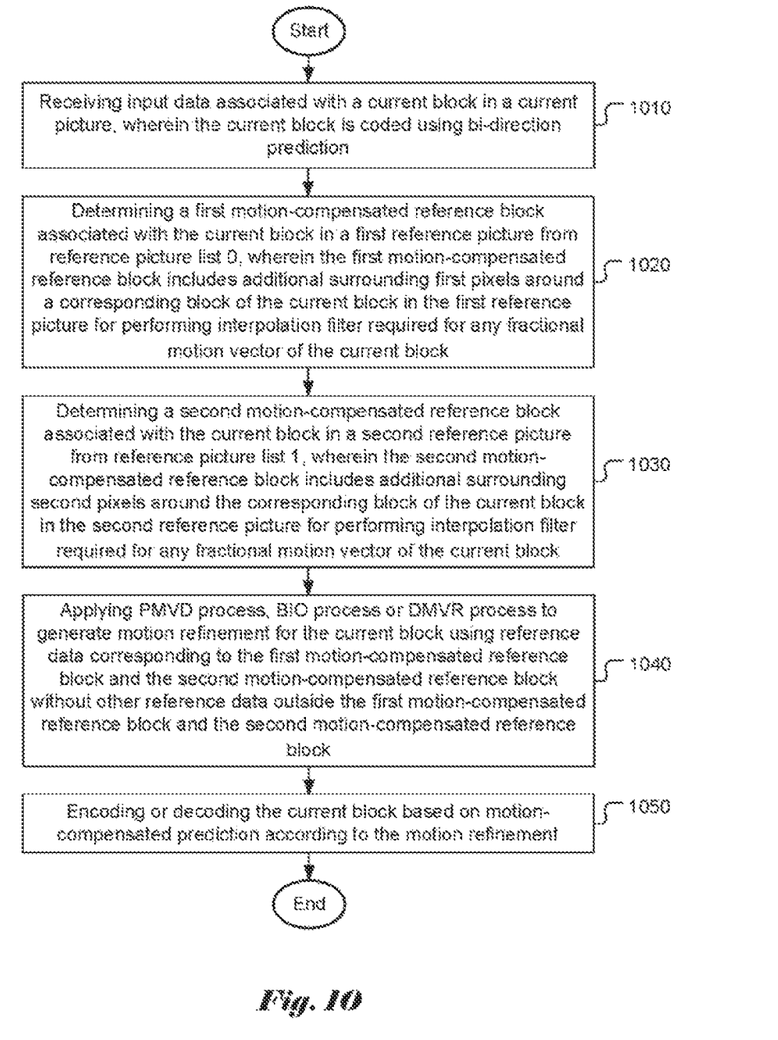
FIG. 10 illustrates an exemplary flowchart of a video coding system using Pattern-based MV derivation (PMVD), Bi-directional optical flow (BIO) or Decoder-side MV refinement (DMVR) to refine motion for a bi-direction predicted block according to an embodiment of the present invention.

FIG. 10 illustrates an exemplary flowchart of a video coding system using Pattern-based MV derivation (PMVD), Bi-directional optical flow (BIO) or Decoder-side MV refinement (DMVR) to refine motion for a bi-direction predicted block according to an embodiment of the present invention. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, input data associated with a current block in a current picture is received in step 1010, where the current block is coded using bi-direction prediction. A first motion-compensated reference block associated with the current block in a first reference picture from reference picture list 0 is determined in step 1020, where the first motion-compensated reference block includes additional surrounding first pixels around a corresponding block of the current block in the first reference picture for performing interpolation filter required for any fractional motion vector of the current block. A second motion-compensated reference block associated with the current block in a second reference picture from reference picture list 1 is determined in step 1030, where the second motion-compensated reference block includes additional surrounding second pixels around the corresponding block of the current block in the second reference picture for performing interpolation filter required for any fractional motion vector of the current block. The PMVD process, BIO process or DMVR process is applied to generate motion refinement for the current block using reference data corresponding to the first motion-compensated reference block and the second motion-compensated reference block without other reference data outside the first motion-compensated reference block and the second motion-compensated reference block in step 1040, so that the required system memory bandwidth can be reduced. The current block is encoded or decoded based on motion-compensated prediction according to the motion refinement in step 1050.

Figure 11:
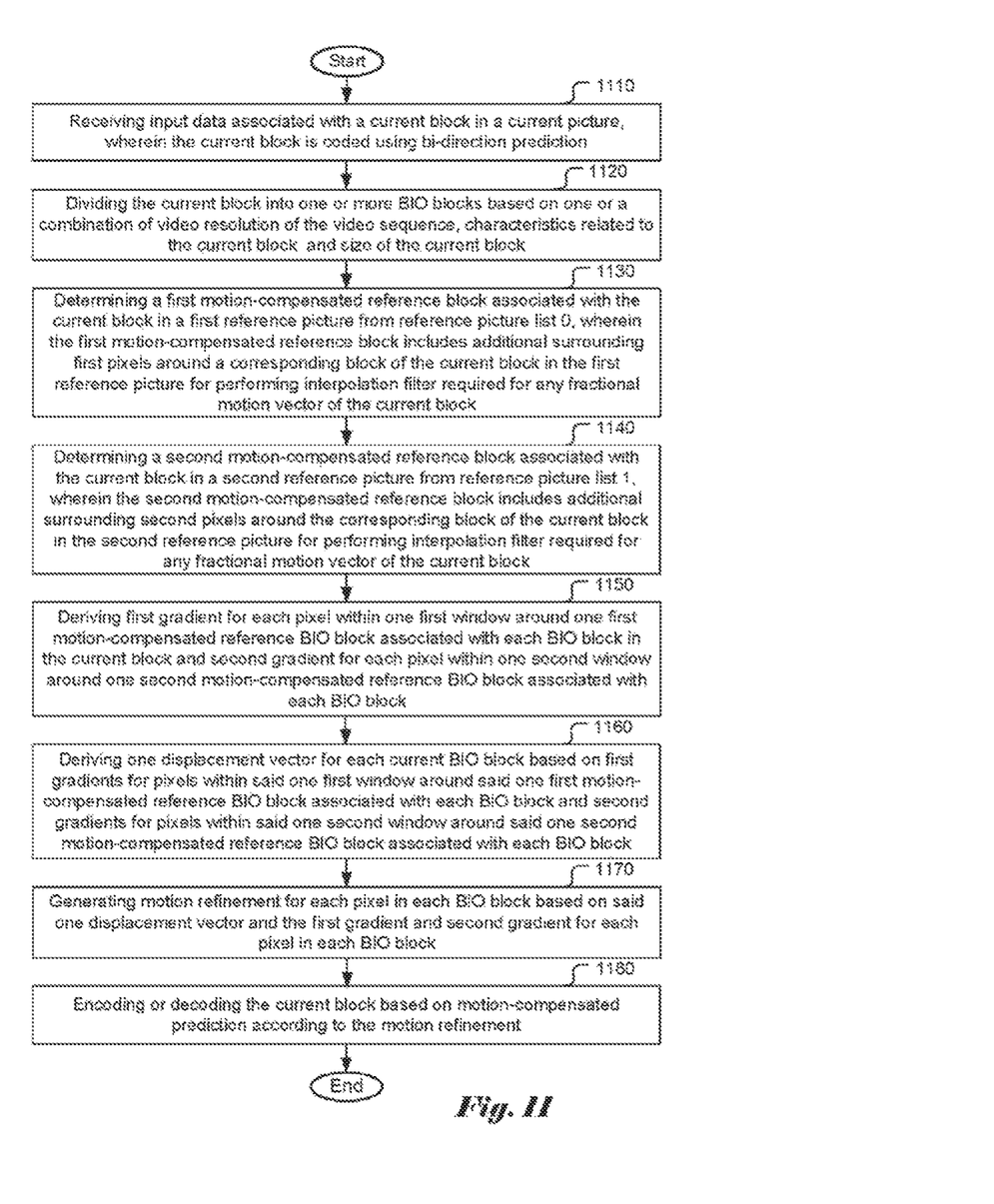
FIG. 11 illustrates an exemplary flowchart of a video coding system using Bi-directional optical flow (BIO) to refine motion for a bi-direction predicted block according to an embodiment of the present invention, where the current block is divided into one or more BIO blocks based on video resolution of the video sequence, characteristics related to the current block or size of the current block.

FIG. 11 illustrates an exemplary flowchart of a video coding system using Bi-directional optical flow (BIO) to refine motion for a bi-direction predicted block according to an embodiment of the present invention, where the current block is divided into one or more BIO blocks based on one or a combination of video resolution of the video sequence, characteristics related to the current block, and size of the current block. According to this method, input data associated with a current block in a current picture is received in step 1110, where the current block is coded using bi-direction prediction. The current block is divided into one or more BIO blocks based on one or a combination of video resolution of the video sequence, characteristics related to the current block and size of the current block in step 1120. A first motion-compensated reference block associated with the current block in a first reference picture from reference picture list 0 is determined in step 1130, where the first motion-compensated reference block includes additional surrounding first pixels around a corresponding block of the current block in the first reference picture for performing interpolation filter required for any fractional motion vector of the current block. A second motion-compensated reference block associated with the current block in a second reference picture from reference picture list 1 is determined in step 1140, where the second motion-compensated reference block includes additional surrounding second pixels around the corresponding block of the current block in the second reference picture for performing interpolation filter required for any fractional motion vector of the current block. A first gradient for each pixel within one first window around one first motion-compensated reference BIO block associated with each BIO block in the current block and a second gradient for each pixel within one second window around one second motion-compensated reference BIO block associated with each BIO block are derived in step 1150. One displacement vector is generated for each current BIO block based on first gradients for pixels within said one first window around said one first motion-compensated reference BIO block associated with each BIO block and second gradients for pixels within said one second window around said one second motion-compensated reference BIO block associated with each BIO block in step 1160. Motion refinement is then generated for each pixel in each BIO block based on said one displacement vector and the first gradient and second gradient for each pixel in each BIO block in step 1170. The current block is encoded or decoded based on motion-compensated prediction according to the motion refinement in step 1180.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using Pattern-based MV derivation (PMVD) or Decoder-side MV refinement (DMVR) to refine motion for a bi-direction predicted block, the method comprising:
receiving input data associated with a current block in a current picture, wherein the current block is coded using bi-direction prediction;
determining a first motion-compensated reference block associated with the current block in a first reference picture from a reference picture list 0, wherein the first motion-compensated reference block includes additional surrounding first pixels around a first corresponding block of the current block in the first reference picture for performing interpolation filtering required for any fractional motion vector of the current block;
determining a second motion-compensated reference block associated with the current block in a second reference picture from a reference picture list 1, wherein the second motion-compensated reference block includes additional surrounding second pixels around a second corresponding block of the current block in the second reference picture for performing interpolation filtering required for any fractional motion vector of the current block;
applying a PMVD process or a DMVR process to generate motion refinement for the current block using reference data corresponding to the first motion-compensated reference block and the second motion-compensated reference block without other reference data outside the first motion-compensated reference block and the second motion-compensated reference block; and
encoding or decoding the current block based on motion-compensated prediction according to the motion refinement,
wherein the PMVD process, the DMVR process, or the motion-compensated prediction comprises:
in response to applying a filter that refers to samples having a first portion of the samples within the first motion-compensated reference block and the second motion-compensated reference block and a second portion of the samples outside the first motion-compensated reference block and the second motion-compensated reference block,
generating padded samples according to the first portion of the samples, and
applying the filter according to the first portion of the samples and the padded samples without using the second portion of the samples.

2. The method of claim 1, wherein the padded samples are generated by extending boundary pixels of the first portion of the samples.

3. The method of claim 1, wherein the padded samples are generated by mirroring boundary pixels of the first portion of the samples.

4. An apparatus of video coding using Pattern-based MV derivation (PMVD) or Decoder-side MV refinement (DMVR) to refine motion for a bi-direction predicted block, the apparatus of video coding comprising one or more electronic circuits or processors configured to:
receive input data associated with a current block in a current picture, wherein the current block is coded using bi-direction prediction;
determine a first motion-compensated reference block associated with the current block in a first reference picture from a reference picture list 0, wherein the first motion-compensated reference block includes additional surrounding first pixels around a first corresponding block of the current block in the first reference picture for performing interpolation filtering required for any fractional motion vector of the current block;
determine a second motion-compensated reference block associated with the current block in a second reference picture from a reference picture list 1, wherein the second motion-compensated reference block includes additional surrounding second pixels around a second corresponding block of the current block in the second reference picture for performing interpolation filtering required for any fractional motion vector of the current block;
apply a PMVD process or a DMVR process to generate motion refinement for the current block using reference data corresponding to the first motion-compensated reference block and the second motion-compensated reference block without other reference data outside the first motion-compensated reference block and the second motion-compensated reference block; and
encode or decode the current block based on motion-compensated prediction according to the motion refinement,
wherein the one or more electronic circuits or processors are configured to apply the PMVD process, the DMVR process, or the motion-compensated prediction by performing at least:
in response to applying a filter that refers to samples having a first portion of the samples within the first motion-compensated reference block and the second motion-compensated reference block and a second portion of the samples outside the first motion-compensated reference block and the second motion-compensated reference block,
generating added samples according to the first portion of the samples, and
applying the filter according to the first portion of the samples and the padded samples without using the second portion of the samples.

5. The apparatus of claim 4, wherein the padded samples are generated by extending boundary pixels of the first portion of the samples.

6. The apparatus of claim 4, wherein the padded samples are generated by mirroring boundary pixels of the first portion of the samples.

7. A non-transitory computer readable medium storing program instructions causing a processing circuit of an apparatus to perform a video coding method, and the method comprising:
receiving input data associated with a current block in a current picture, wherein the current block is coded using bi-direction prediction;
determining a first motion-compensated reference block associated with the current block in a first reference picture from a reference picture list 0, wherein the first motion-compensated reference block includes additional surrounding first pixels around a first corresponding block of the current block in the first reference picture for performing interpolation filtering required for any fractional motion vector of the current block;

determining a second motion-compensated reference block associated with the current block in a second reference picture from a reference picture list 1, wherein the second motion-compensated reference block includes additional surrounding second pixels around a second corresponding block of the current block in the second reference picture for performing interpolation filtering required for any fractional motion vector of the current block;

applying a Pattern-based MV derivation (PMVD) process or a Decoder-side MV refinement (DMVR) process to generate motion refinement for the current block using reference data corresponding to the first motion-compensated reference block and the second motion-compensated reference block without other reference data outside the first motion-compensated reference block and the second motion-compensated reference block; and encoding or decoding the current block based on motion-compensated prediction according to the motion refinement, wherein the PMVD process, the DMVR process, or the motion-compensated prediction comprises:

in response to applying a filter that refers to samples having a first portion of the samples within the first motion-compensated reference block and the second motion-compensated reference block and a second portion of the samples outside the first motion-compensated reference block and the second motion-compensated reference block, generating padded samples according to the first portion of the samples, and applying the filter according to the first portion of the samples and the padded samples without using the second portion of the samples.

8. The non-transitory computer readable medium of claim 7, wherein the padded samples are generated by extending boundary pixels of the first portion of the samples.

9. The non-transitory computer readable medium of claim 7, wherein the padded samples are generated by mirroring boundary pixels of the first portion of the samples.

* * * * *